Feb. 27, 1968   T. W. WALDROP   3,370,628
METHOD OF AND MEANS FOR ADJUSTING KNIVES IN FORAGE CHOPPER
Filed May 18, 1965   3 Sheets-Sheet 2
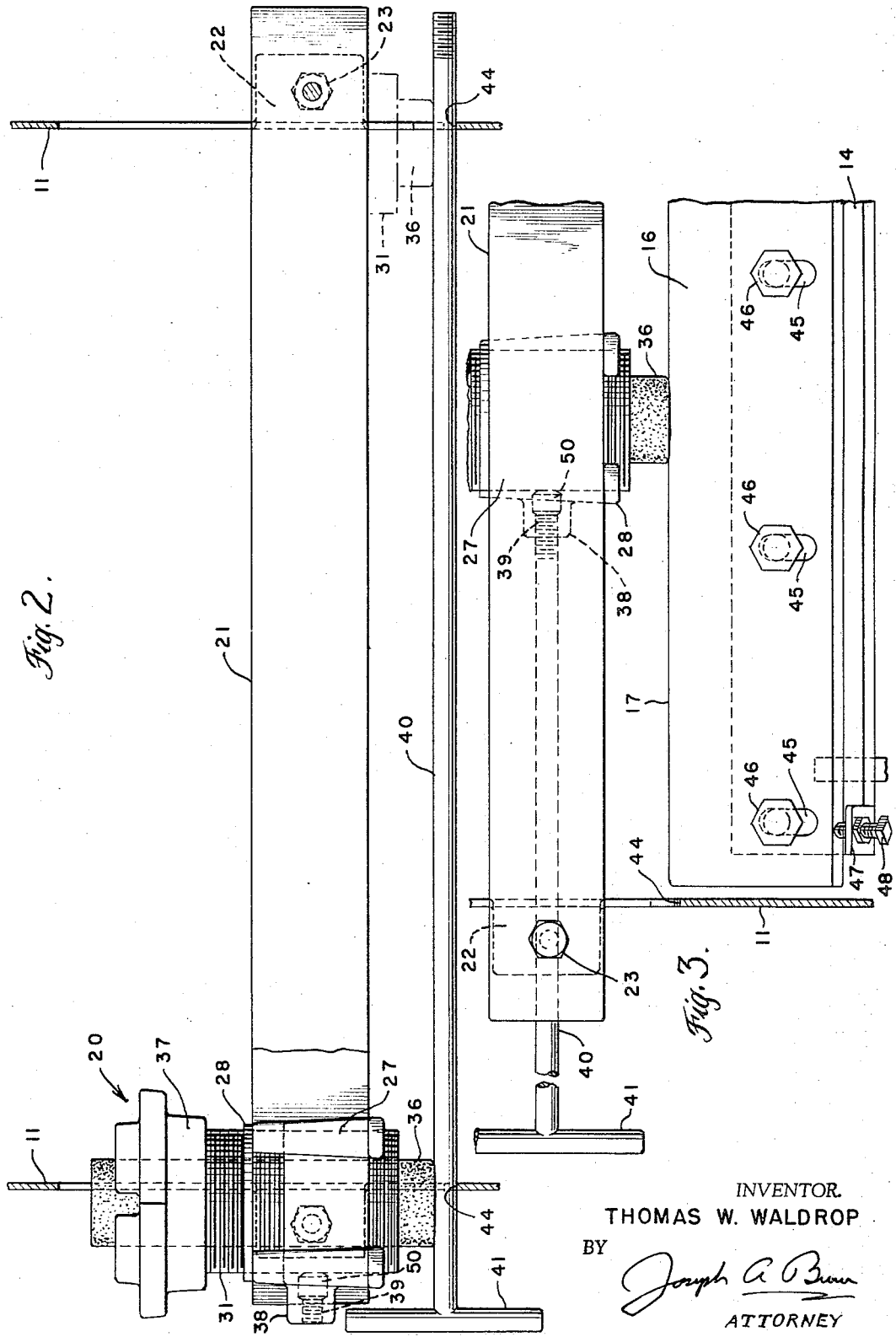
INVENTOR.
THOMAS W. WALDROP
BY
*Joseph A. Brown*
ATTORNEY Feb. 27, 1968  T. W. WALDROP  3,370,628
METHOD OF AND MEANS FOR ADJUSTING KNIVES IN FORAGE CHOPPER
Filed May 18, 1965  3 Sheets-Sheet 3
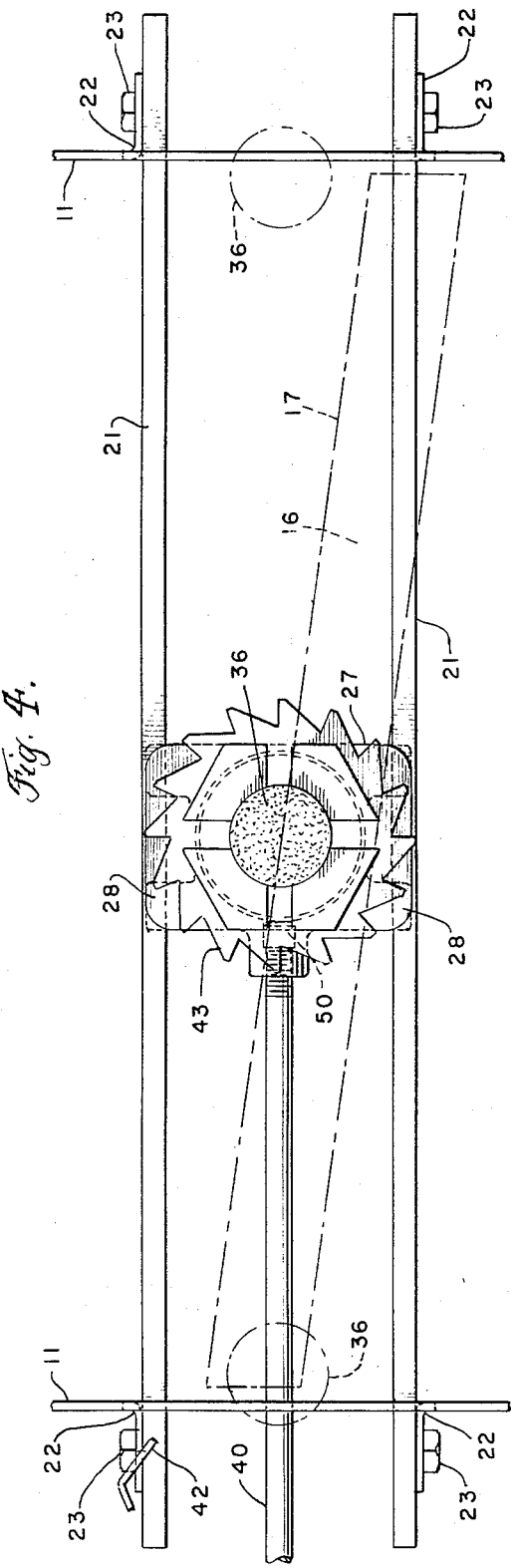
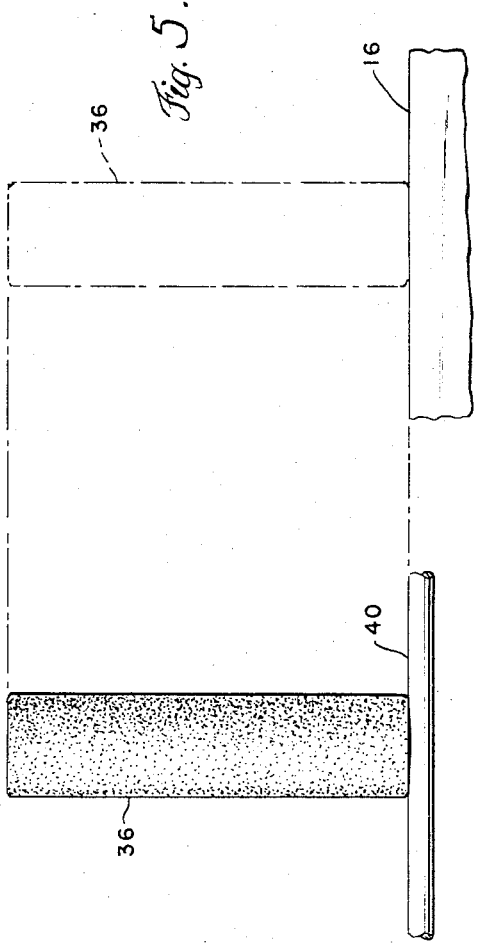
INVENTOR.
THOMAS W. WALDROP
BY
ATTORNEY United States Patent Office 3,370,628
Patented Feb. 27, 1968

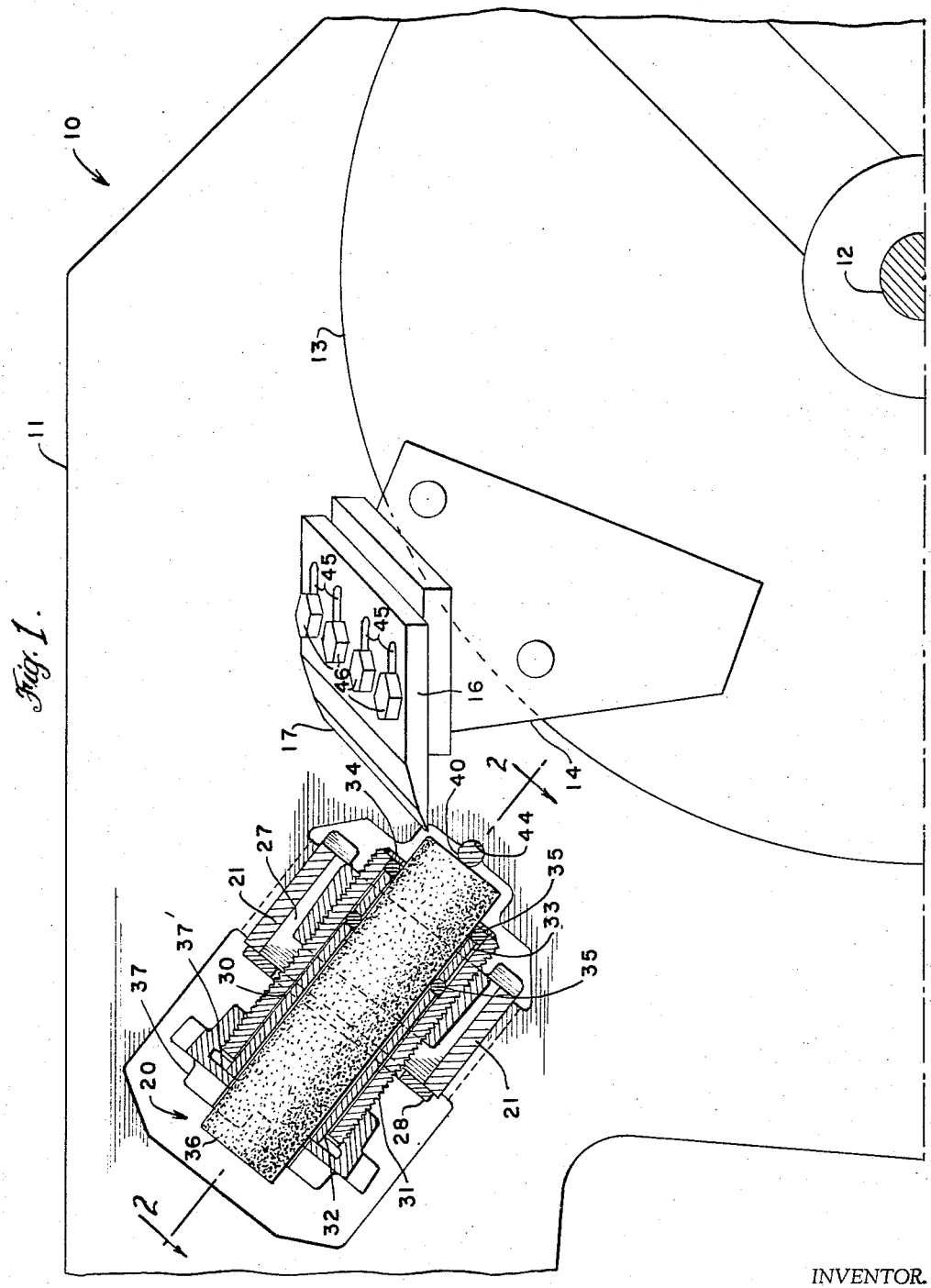

3,370,628
METHOD OF AND MEANS FOR ADJUSTING KNIVES IN FORAGE CHOPPER
Thomas W. Waldrop, Ronks, Pa., assignor to Sperry Rand Corporation, New Holland, Pa., a corporation of Delaware
Filed May 18, 1965, Ser. No. 456,773
10 Claims. (Cl. 146—242)

ABSTRACT OF THE DISCLOSURE

A forage harvester having a rotary cutterhead of the reel or cylinder type and a sharpening attachment which is guided for reciprocation back and forth in an axial direction with its sharpening element contiguous to the surface generated by the rapidly rotating knives of the cutterhead. Gage means is provided for positioning the sharpening element to a given radial distance from the cutterhead axis so that the cutterhead knives can be adjusted relative to the precisely positioned sharpening element.

---

The present invention relates generally to forage harvesters. More particularly, the invention relates to a forage harvester having a rotary cutterhead of the reel or cylinder type and to means for setting the knives carried on the rotary cutterhead.

It is common in forage harvesters to provide a sharpening attachment to sharpen the knives on the cutterhead. The sharpening attachment is guided for manual reciprocation back and forth over the cutterhead with its sharpening element contiguous to the surface generated by rapidly rotating knives on the cutterhead. The sharpening element is mounted in a chuck threadedly supported in a carrier slidable on suitable guide tracks. In one type of sharpener, ratchet means is provided for step-rotating the chuck and its carrier at the end of each return stroke of the attachment to step the sharpening element toward the rotating knives and compensate for wear of the element incident to the sharpening function. In other types of sharpeners, the element is manually indexed toward the knives.

The cutterhead knives, of course, wear and must eventually be replaced. Also, most cutterheads are designed to accommodate different numbers of knives for different crops and crop conditions. Thus, the setting of cutterhead knives in a forage harvester is a not infrequent operation. It is necessary to very precisely set the knives so that they generate a true cylinder on rotation, and will therefore form the proper clearance with the shear bar along its axial length. Ideally, a shear bar to cutterhead clearance of ten to fifteen thousandths should be maintained. In known prior art machines, a special gage is used to set the knives. Normally this gage must be mounted on the sharpener guide tracks or another portion of the cutterhead housing each time knives are set, and it must be removed after the setting operation. The installation and removal of the special gage is a time consuming operation. Since the gage is not an integral part of the harvester, it is frequently lost or misplaced and not available when needed in the field.

Accordingly, one object of this invention is to provide a forage harvester of the character described with a novel and improved means for setting cutterhead knives.

Another object of this invention is to provide means for setting cutterhead knives which is an integral part of the forage harvester.

Another object of this invention is to provide an arrangement whereby a sharpening attachment of the character described is used in setting cutterhead knives.

A further object of this invention is to provide a sharpening attachment of the character described with a single handle and gage means.

A still further object of this invention is to provide a means for setting forage harvester cutterhead knives which is simple, operates with precision, and is inexpensive to construct.

Other objects of this invention will be apparent hereinafter from the specification and from the recital in the appended claims.

In the drawings:

FIG. 1 shows a forage harvester cutterhead and housing constructed according to this invention and the sharpening attachment therefor in section with the sharpening element adjusted to contact the handle gage rod positioned in the side wall grooves.

FIG. 2 is a sectional view taken on line 2—2 of FIG. 1 looking in the direction of the arrows with the side walls of the harvester housing shown in section and the sharpening unit in elevation in solid lines at the left side of the housing and with the handle gage rod positioned in the grooves of the side walls, the sharpening element being shown in dot-and-dash lines in contrast with the rod on the right hand side;

FIG. 3 is a similar fragmentary view showing the handle gage rod installed in the carriage of the sharpening attachment and the sharpening element in the knife-setting position relative to a reel knife;

FIG. 4 is a plan view with a cutterhead knife shown in phantom and with dot-and-dash circles indicating the right and left hand gaging positions of the sharpening element; and FIG. 5 is a diagrammatic view showing the sharpening element in full lines in contact with the gage rod and in phantom in engagement with a cutterhead knife.

Referring now to the drawings by numerals of reference, 10 denotes a forage harvester having a usual cutterhead housing, two opposite side walls of which 11—11 are shown. Suitably journalled in walls 11 is a shaft 12 which rotatably supports a cutterhead or reel having axially spaced end discs 13 (FIG. 1). Carried between discs 13 are a plurality of supports 14, each of which carries a knife or cutter element 16 for rotation with the cutterhead. In the illustration shown, the knives 16 are arranged with their cutting edges 17 diagonal relative to their axis of rotation to cooperate with a stationary shear bar (not shown) to cut material processed by the cutterhead. The knives 16 are so formed that all of the knife edges are located the same radial distance from shaft 12 and on rotation of the cutterhead generate a cylinder.

Mounted on the harvester is a sharpening attachment 20 which comprises a guide track having spaced parallel track bars 21—21 connected at their ends to brackets 22 by bolts 23. Brackets 22 are rigidly affixed to side walls 11 of the cutterhead housing by welding or other means.

Supported between track bars 21 and adapted to be reciprocated along the guide track is a carriage 27 having laterally projecting flanges 28 which extend from the carriage both above and below track bars 21 for sliding engagement therewith. Carriage 27 is adapted to be manually reciprocated back and forth over the guide track in a manner hereinafter described.

Carriage 27 has a generally vertically extending threaded bore 30 in which a chuck or tool holder is mounted for rotation about and movement on an axis transverse to the direction of reciprocation of the carriage and extending radially of the cutterhead axis of rotation. The tool holder comprises an outer tubular sleeve 31 and inner tubular sleeves 32 and 33. Outer sleeve 31 is externally threaded and threadably received in carriage 27. The lower end of sleeve 31 is provided with an inturned flange 34. A pair of O-rings 35 are received in sleeve 31, one O-ring being located between flange 34 and sleeve 33 and the other between the two inner sleeves 32 and 33.

Adjustably mounted in inner sleeves 32 and 33 is a cylindrical, abrasive sharpening element or stone 36, the working end of which extends downwardly below carriage 27. As shown in FIG. 1, the upper end of inner sleeve 32 extends above the upper end of outer sleeve 31. Threaded on outer sleeve 31 is a ratchet wheel 37 having a portion 37' which engages the top of inner sleeve 37. It will be apparent that by tightening ratchet wheel 37 on outer sleeve 31, the inner sleeves 32 and 33 will be forced downwardly distorting and compressing the O-rings 35 to expand them into a tight, intimate embrace with the periphery of sharpening element 36 and thereby fixedly holding the sharpening element against the axial movement in the tool holder. O-rings 35, in addition to fixedly holding the sharpening element, serve the further purpose of cushioning element 36 to minimize vibrations imparted to the tool holder when the sharpening attachment is used.

When the sharpening element becomes worn down, the length of the portion extending downwardly below the carriage may be manually adjusted by unscrewing ratchet wheel 37 an amount sufficient to relieve the force on O-rings 35, sliding element 36 downwardly in sleeves 32 and 33, and then tightening the ratchet wheel on the tool holder.

The carriage 27 is provided with a lateral protrusion 38 (see FIG. 2), having a threaded bore 39. Bore 39 is adapted to receive the threaded end of a handle gage rod 40 which is cylindrical in cross-section and extends between the track bars 21 and through an opening in one of the side walls 11. When the rod is threaded in bore 39, its end bears against element 50 which in turn bears against sleeve 31 to hold the sleeve in place. Element 50 is slidable in the enlarged end of bore 39 and may be made of brass, nylon or some other material for engaging sleeve 31, without damaging the threads thereon. Rod 40 is provided with a handle portion 41 at its outer end. By grasping handle portion 41, rod 40 and carriage 27 connected thereto can be manually reciprocated to move carriage 27 back and forth over tracks 21.

Fastened to bracket 22 adjacent handle portion 41 by bolts 23 is an upright member which supports a pawl 42. In a normal sharpening operation, pawl 42 is mounted so as to engage the radial faces on the teeth 43 around the ratchet wheel 37 when carriage 27 is moved to the far left. The arrangement may be such that each time the pawl 42 engages teeth 43, wheel 37 and the tool holder connected thereto are rotated a circumferential distance of two ratchet teeth, the tool holder being rotated to feed the sharpening element 36 downwardly relative to carriage 27.

As shown in FIGS. 1-3, a pair of gage pockets 44 are formed in side walls 11 to receive handle gage rod 40 during a knife setting operation. The gage pockets are very precisely located relative to each other, and they are the same radial distance from the axis of reel shaft 12. The gage pockets 44 are substantially semicircular with a radius which equals the radius of the handle gage rod 40. The gage rod 40 is also machined to a close tolerance so that when it is seated in gage pockets 44, the portion of the rod which engages the sharpening element 36 is the exact desired radial distance from the axis of reel shaft 12. Knives 16 are formed with slots 45 and can be adjusted inwardly or outwardly on supports 14 when bolts 46 have been loosened. In one embodiment, a flange portion 47 is provided on each end of knife support 14 to receive a set screw 48 which serves as an additional holding means and may be used for indexing the knife 16 during the setting operation (see FIG. 3).

In a knife-setting operation, the cutterhead 13 is manually rotated to position a knife 16 adjacent the sharpening attachment, and bolts 46 are loosened a sufficient amount to allow the knife to slide on its support 14. The handle gage rod is then threaded out of carriage 27 and inserted in gage pockets 44 in side walls 11. With the gage rod in the pockets, ratchet wheel 37 is manually turned to advance the sharpening element 36 into light engagement with the gage rod 40. Rod 40 is then removed from the side walls and reinserted in carriage 27 to lock sleeve 31 in place. Sharpening element 36 is now correctly positioned to be used in setting the knives. For best results, the knives are set against the sharpening element on each end of the cutterhead (see the two element positions shown in FIG. 4). To set a knife, the edge 17 is moved into slight engagement with the sharpening element on each knife end. Mounting bolts 46 are then tightened and the process is repeated until all of the knives on the cutterhead have been set so that their knife edges are the same radial distance from the axis of shaft 12.

It will be apparent from the description that there are numerous advantages in the disclosed means for setting cutterhead knives. The gage means is always available and does not have to be installed and removed for each knife-setting operation. Further, due to the permanent mounting of the gage means, an extremely accurate setting is obtained. The disclosed pawl-and-ratchet means for advancing the stone insures that the stone wears evenly so that it can accurately be used in the knife-setting operation. When the knives are set to generate a true cylinder of rotation, a uniform clearance can be maintained with the shear bar. These adjustments are very important in maintaining a quality cutting action and in lowering power consumption.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In a forage harvester having a rotatable cutterhead of substantial axial length wherein the cutterhead has angularly spaced knives having outer edges which on rotation of the cutterhead generate a cylinder, said knives being adjustable radially inward or outward, a housing for said cutterhead, said housing having a pair of vertical side walls spaced on each end of said cutterhead, a sharpening device for said knives comprising a guide track, said guide track having first and second spaced track members extending parallel to each other and to the axis of said cutterhead, a carriage mounted on said track and reciprocal from one end to an opposite end thereof, said carriage when reciprocated traversing the full axial length of said cutterhead, a tool holder threadably supported on said carriage for adjustment between said track members and toward said cutterhead about an axis transverse to the direction of movement of said carriage, an abrasive sharpening element carried on said tool holder and engageable with said knives, a ratchet wheel fixedly mounted on said tool holder and coaxial therewith, said ratchet wheel having a plurality of ratchet teeth, a pawl mounted adjacent said first track member and at one end of said track, said ratchet wheel being engageable with said pawl when retracted to said one end of said track, said tool holder being rotatably adjustable to index said sharpening element toward said cutterhead responsive to each engagement of said ratchet wheel with said pawl, each of said housing side walls having a gage pocket therein for receiving a gage rod, said sharpening element being adjustable to a down position in engagement with said gage rod by rotation of said tool holder a sufficient amount, said knives being adjustable to engage said sharpening element when in said down position, and said knives forming a true cylinder of rotation when said knife edges are engageable with said sharpening element in its down position along the axial length of the cutterhead.

2. A device, as recited in claim 1, wherein said sharpening device comprises a detachably mounted handle, and said handle serves as said gage rod when detached from said sharpening device.

3. An agricultural machine comprising a cutterhead mounted for rotation about an axis, a plurality of angularly spaced knives on said cutterhead which on rotation generate a cylinder, said knives being adjustable radially inwardly or outwardly to increase or decrease the diameter of said cylinder of rotation, a sharpening element on said machine which is movable along a line parallel to said axis, said sharpening element being adjustable radially inward and outward toward and away from said axis, gage means on said machine for setting said sharpening element in an inward position at a given distance from said axis of rotation, and said knives generating a true cylinder of rotation when said knives are engageable with sharpening element in its inward position.

4. An agricultural machine, as recited in claim 3 wherein said sharpening element comprises a detachably mounted handle and said handle when detached serves as said gage means for setting said sharpening element.

5. A machine comprising a cutter mounted for rotation about an axis, at least one knife on said cutter, said knife being adjustable toward and away from said axis, said knife describing a predetermined surface upon rotation when in proper adjustment, an indexing device mounted on said machine, said indexing device being adjustable toward and away from said axis, means for setting said indexing device at a given distance from said axis of rotation, said knife being adjustable to engage said indexing device when set at said given distance, said knife being in proper adjustment when in engagement with said indexing device, said indexing device including a sharpener which is movable along a line parallel to said axis, and said means comprising a gage rod which serves as a handle for said sharpener when said indexing device has been set.

6. In a forage harvester having a rotatable cutterhead wherein the cutterhead had adjustable angularly spaced knives, said knives generating a true cylinder on rotation when properly adjusted, a sharpening device on said harvester for said knives, means for adjusting said sharpening device to a given position, said knives being in proper adjustment when they are engageable with said sharpening device in said given position, and said means comprising a gage rod which serves as a handle for said sharpening device when said sharpening device has been adjusted to said given position.

7. In a forage harvester having a rotatable cutterhead of substantial axial length wherein the cutterhead has angularly spaced knives having outer edges which on rotation of the cutterhead generate a cylinder, said knives being adjustable radially inward or outward, a housing for said cutterhead, said housing having a pair of vertical side walls spaced on each end of said cutterhead, a sharpening device for said knives comprising a guide track, said guide track having first and second spaced track members extending parallel to each other and to the axis of said cutterhead, a carriage mounted on said track and reciprocal from one end to an opposite end thereof, said carriage when reciprocated traversing said cutterhead, a tool holder threadably supported on said carriage for adjustment between said track members and toward said cutterhead about an axis transverse to the direction of movement of said carriage, an abrasive sharpening element carried on said tool holder and engageable with said knives, said tool holder being rotatably adjustable to index said sharpening element toward said cutterhead, a gage rod, each of said housing side walls having a gage pocket therein for receiving said gage rod, said gage pockets being the same radial distance from the axis of rotation of said cylinder, said gage rod when located in said pockets being parallel to said axis of rotation, said sharpening element being adjustable to a down position in engagement with said gage rod by rotation of said tool holder a sufficient amount, said knives being adjustable to engage said sharpening element when said gage rod is removed from said gage pockets and said element is in said down position, and said knives forming a true cylinder of rotation when said knife edges are engageable with said sharpening element in its down position along the axial length of the cutterhead.

8. A device, as recited in claim 7, wherein said gage rod is selectively positionable in two locations, one threadably received in said sharpening device to serve as a handle to reciprocate said carriage and in a second location wherein the gage rod is disconnected from said sharpening device and seats in said gage pockets.

9. A device, as recited in claim 8, wherein said gage pockets are substantially semicircular, said gage rod is cylindrical, and the radii of said pockets are generally equal to the radius of said rod.

10. A method of setting cutterhead knives in a forage harvester having a rotatable cutterhead with a plurality of angularly spaced knives and a sharpening device including a sharpening element comprising the steps of:
 (a) adjusting the sharpening element to a given radial distance from the cutterhead axis,
 (b) positioning the sharpening element adjacent one axial end of the cutterhead,
 (c) advancing the edge of a first knife at said one end into contact with the sharpening element,
 (d) positioning the sharpening element adjacent the opposite axial end of the cutterhead,
 (e) advancing the edge of said first knife at said opposite end into contact with the sharpening element,
 (f) performing steps (a) through (e) on the remaining knives on said cutterhead, and
 (g) retracting said sharpening element to a storage position.

References Cited
UNITED STATES PATENTS

| | | | |
|---|---|---|---|
| 1,026,136 | 5/1912 | Watkins et al. | 33—185 |
| 1,738,005 | 12/1929 | Holm et al. | 51—250 |
| 2,622,335 | 12/1952 | Smith | 33—185 |
| 2,735,248 | 2/1956 | West et al. | 51—246 |
| 3,059,384 | 10/1962 | McClellan | 51—250 |

W. GRAYDON ABERCROMBIE, *Primary Examiner.*